United States Patent [19]

Haraguchi et al.

[11] Patent Number: 4,766,360
[45] Date of Patent: Aug. 23, 1988

[54] INDUCTION GENERATOR/MOTOR SYSTEM

[75] Inventors: Eiji Haraguchi, Ibaraki; Hiroto Nakagawa, Osaka; Akira Bando, Hitachi; Yoji Tanaka, Hitachi; Kenichi Ono, Hitachi; Hiroshi Kashiwazaki, Hitachi; Hiroshi Sugisaka, Hitachi, all of Japan

[73] Assignees: Hitachi, Ltd.; The Kansai Electric Power Co., Both of Tokyo, Japan

[21] Appl. No.: 911,072

[22] Filed: Sep. 24, 1986

[30] Foreign Application Priority Data

Sep. 25, 1985 [JP] Japan .................................. 60-210003

[51] Int. Cl.⁴ .............................................. H02P 5/40
[52] U.S. Cl. ..................................... 318/732; 318/798; 318/806
[58] Field of Search ............... 318/798, 806, 800, 732; 363/54, 55, 57, 160, 161, 162

[56] References Cited

U.S. PATENT DOCUMENTS 3,654,541 4/1972 Kelley, Jr. et al. ................. 363/161
3,942,092 3/1976 Bourbeau et al. .................. 363/162

Primary Examiner—David Smith, Jr.
Attorney, Agent, or Firm—Antonelli, Terry & Wands

[57] ABSTRACT

An induction generator/motor system has an induction machine connected at its secondary side to a cyclo-converter. An induced voltage develops when the cyclo-converter pauses during a transient phenomenon occurring in the system. When the induced voltage exceeds a predetermined voltage range which covers the maximum output voltage derivable from the cyclo-converter, the polarity of thyristor converters of the cyclo-converter is switched such that the induced voltage is applied to a thyristor converter to be rendered conductive next in forward relationship therewith, thereby preventing occurrence of an overvoltage.

6 Claims, 12 Drawing Sheets

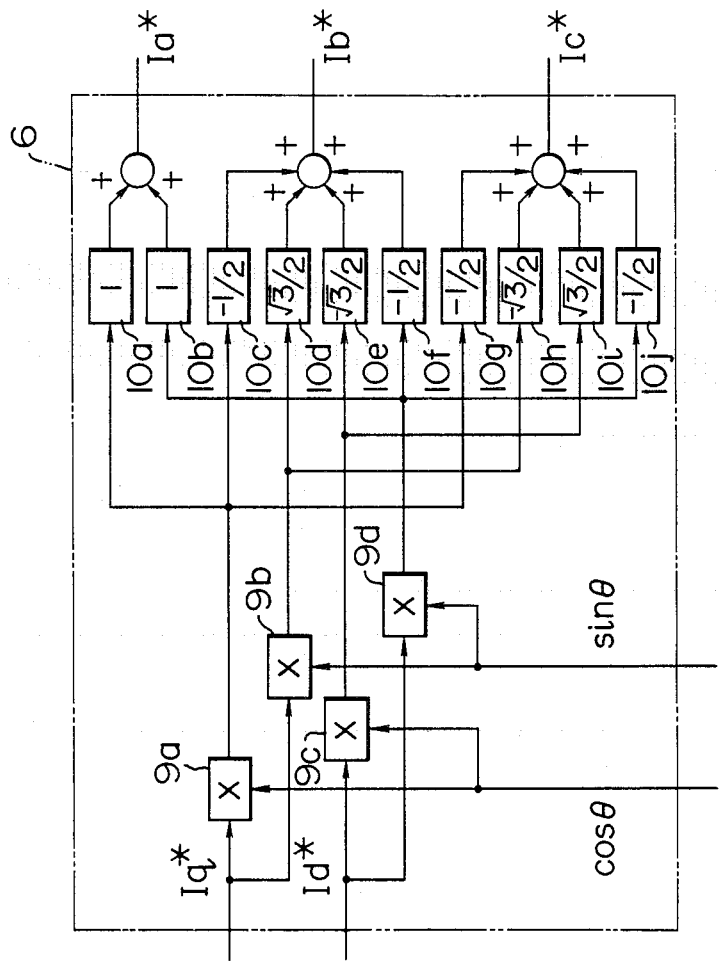
F I G. 2

FIG. II

INDUCTION GENERATOR/MOTOR SYSTEM

BACKGROUND OF THE INVENTION

This invention relates to indication generator/motor systems and more particularly to an induction generator/motor system whose effective power output and reactive power output are controlled by controlling the secondary current while operating a pump hydraulic turbine at variable speeds.

As an induction generator/motor system utilizing an induction machine with its secondary side connected to a power converter, there have been available a system as disclosed in Japanese Patent Publication No. 53-7628 wherein effective power is controlled by controlling a secondary current component which is in phase, as viewed from the stator, with stator voltage and another system as disclosed in Japanese Patent Publication No. 57-60645 wherein reactive power is controlled by controlling a secondary current component which is 90° out of phase, as viewed from the stator, with the stator voltage. These systems are respectively suitable for use as a power factor regulator and a power regulator which are capable of making a quick response while preventing hunting and pull out.

When applying these systems to a generator/motor system of large capacity such as a variable speed pump-up generator system, the capacity of thyristors constituting a power converter connected to the secondary side becomes large. A cyclo-converter used as the power converter, especially, a non-circulating current type cyclo-converter is suited for the purpose of reducing the required capacity of the thyristors.

In controlling the secondary current of the induction machine, when voltage on an AC power line system varies greatly an account of an accident in the AC power line system, a DC transient current will flow in the primary side of the induction machine. Because of this DC transient current, a rotating frequency current component of a frequency equivalent to a revolution number is induced in the secondary side of the induction machine and superimposed on a slip frequency current component. Where the non-circulating type cyclo-converter is used as the power converter for secondary excitation, the polarity or direction of current conduction in the cyclo-converter is typically switched by first interrupting one conductive direction and after lapse of a thyristor turn-off time, applying a current conduction signal for the other conductive direction. Therefore, in a phase where a superimposed current of the rotating frequency current component and slip frequency current component flows in a direction of the conduction polarity of the cyclo-converter, the transient current due to the rotating frequency current component is permitted to conduct without raising any problem. But when the superimposed current is directed in opposition to the conduction polarity, its conduction is prevented, resulting in the open state of the cyclo-converter and consequent interruption of the secondary current, and this causes a large induced voltage to develop in an opened secondary winding to maintain magnetic balance on the secondary side. Disadvantageously, the induced voltage damages the cyclo-converter and the secondary winding of the induction machine.

It has been proven by analysis and experiments conducted by the present inventors that the induced voltage in the secondary side extremely exceeds a rated voltage of the cyclo-converter determined by a normally set maximum slip. Prevention of the occurrence of induced overvoltage is therefore needed.

Generally, a method of protecting the thyristor power converter against overvoltage is to connect a non-linear resistor element in parallel with the output circuit of the thyristor converter, the resistor element having such a characteristic as to decrease its resistance under the application of voltage in excess of a predetermined voltage. In a conventional system applied with this method, when the flow of the superimposed current is in opposition to the conduction polarity of the power converter, the superimposed current flows through the non-linear resistor element to suppress the occurrence of the overvoltage in the power converter but at the same time, it generates a large heat loss in the non-linear resistor element. Accordingly, the non-linear resistor element is required to have a very large heat capacity and in fact this method is unpractical.

Another method for protection against overvoltage is such that a pair of thyristor short-circuiting switches connected in anti-parallel relationship are connected in parallel with the output circuit of a power converter, and upon generation of an excessive voltage in the power converter, the thyristor short-circuiting switches are turned on to prevent the occurrence of an overvoltage in the secondary circuit of the induction machine. In the induction generator/motor based on the secondary current control, the secondary current of the induction machine is detected and fed back for controlling. However, the short-circuiting of the secondary circuit of the induction machine upon the generation of the overvoltage according to this protection method will make the value of the current flowing through the secondary circuit independent of the output current of the power converter. Further it is not possible to provide suitable means for positively turning off the short-circuiting of the secondary circuit and therefore after the short-circuiting, the secondary current control based on feedback becomes impossible and the induction machine must be stopped for operating temporarily. Disadvantageously, this method can not therefore be employed for an induction generator/motor which is required to operate continuously with high reliability.

SUMMARY OF THE INVENTION

An object of this invention is to provide an induction generator/motor system which can protect the induction system against an excessive, induced secondary voltage due to a rapid variation in voltage on the AC power line system without increasing capacity of the induction system and which can continue stable secondary current control without stopping the operation of the induction system even upon occurrence of the excessive voltage.

According to this invention, in view of the facts that the amplitude of the secondary voltage induced in the secondary side of an induction machine in response to a rapid variation in voltage on the AC power line system exceeds the amplitude of the maximum output voltage of the power converter and that the polarity of the overvoltage corresponds to the succeeding polarity into which the power converter is inverted, the power converter is controlled to operate for inversion of its output polarity each time the overvoltage is generated, whereby the secondary current is passed through a thyristor converter of the power converter to prevent occurrence of the overvoltage in the secondary side of the induction machine.

BRIEF DESCRIPTION OF THE DRAWINGS

FIG. 2 is a block diagram showing the construction of a current command arithmetic unit in FIG. 1;

DESCRIPTION OF THE PREFERRED EMBODIMENTS

Figure 1:
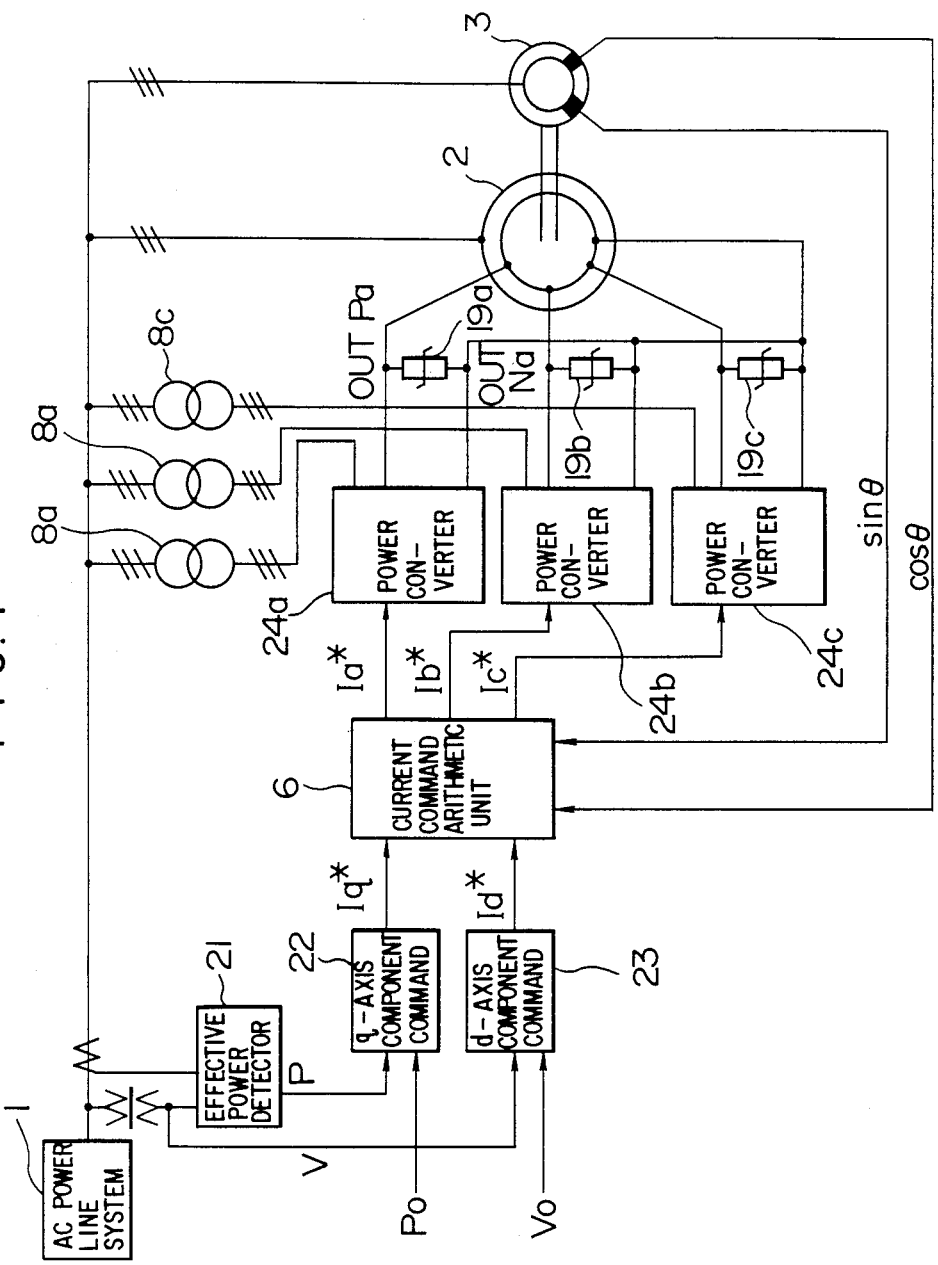
FIG. 1 is a schematic block diagram showing an induction generator/motor system according to an embodiment of the invention.

Referring to FIG. 1, there is illustrated an induction generator/motor system according to an embodiment of the invention in which an induction machine 2 is connected to an AC power line system 1 and a phase detector 3 is adapted to detect a slip phase equal to a difference between a phase of voltage on the AC power line system 1 and a rotating angle of induction machine 2 in terms of electrical angle. The phase detector 3 has a rotor coupled to a rotary shaft of the induction machine 2 and wound with three-phase windings connected in parallel with primary windings of the induction machine 2. The phase detector 3 has a stator mounted with two Hall converters which are located at different phase positions spaced $\pi/2$ electrical angle to detect a signal representative of cos $\theta$ which is in phase with a voltage on the AC power line system 1 as viewed from the secondary side of the induction machine 2, where $\theta$ is a phase angle of the voltage on the AC power line, and a signal representative of sin $\theta$ which is $\pi/2$ out of phase with the voltage on the AC power line system. A detector 21 detects effective power delivered from the induction machine 2. A q-axis component current command generator 22 produces a q-axis component current command Iq* on the basis of a difference between a detected output value P from the effective power detector 21 and an effective power set value Po which is set externally by an operator. The q-axis component current command is representative of a component of the secondary current which is, as viewed from the primary side, in phase with the voltage on the AC power line system 1 (this component being hereinafter referred to as a q-axis component) and it is of a DC value during a stationary state. To produce the command Iq*, the q-axis component current command generator 22 may alternatively respond to a difference between the detected output value P and a set value of, for example, torque or revolution number of the induction machine 2 or frequency of the AC power line system 1.

A d-axis component current command generator 23 produces a d-axis component current command Id* on the basis of a difference between a detected effective value V reactive power set value Vo which is set etternally by the operator. of the voltage on the AC power line system 1 and a reacoperator. The d-axis component current command is representative of a component of the secondary current of induction machine 2 which is $\pi/2$ out of phase, as viewed from the primary side, with the voltage on the AC power line system 1 (this component being hereinafter referred to as a d-axis component) and it is of a DC value during a stationary state. To produce the command Id*, the d-axis component current command generator 23 may alternatively respond to a difference between the detected value V and a set value Vo of, for example, reactive power output of the induction machine 2 or voltage on the AC power line system 1. A current command arithmetic unit 6 utilizes the output signals cos $\theta$ and sin $\theta$ from the phase detector 3 to calculate, from the output command Iq* of the q-axis component current command generator 22 and the output command Id* of the d-axis component current command generator 23, current commands Ia*, Ib* and Ic* for respective phase of the secondary side of the induction machine 2 pursuant to equation (1):

$$\begin{bmatrix} Ia^* \\ Ib^* \\ Ic^* \end{bmatrix} = K \begin{bmatrix} \cos\theta, & \sin\theta \\ \left(\frac{-1}{2}\right)\cos\theta + \left(\frac{\sqrt{3}}{2}\right)\sin\theta, & \left(\frac{-1}{2}\right)\sin\theta + \left(\frac{-\sqrt{3}}{2}\right)\cos\theta \\ \left(\frac{-1}{2}\right)\cos\theta + \left(\frac{-\sqrt{3}}{2}\right)\sin\theta, & \left(\frac{-1}{2}\right)\sin\theta + \left(\frac{\sqrt{3}}{2}\right)\cos\theta \end{bmatrix} \begin{bmatrix} Iq^* \\ Id^* \end{bmatrix} \quad (1)$$

where K is a constant.

FIG. 2 illustrates a detailed circuit of the current command arithmetic unit 6 constructed for K=1. Multipliers 9a to 9d and amplifiers 10a to 10j compute the secondary current commands Ia*, Ib* and Ic*.

Power conventers 24a, 24b and 24c each control each of the secondary phase current of the induction machine 2 such that the three-phase secondary currents are varied to follow the current commands Ia*,,Ib* and Ic* of the current command arithmetic unit 6, respectively. Receiving transformers 8a, 8b and 8c connect the power converters 24a, 24b and 24c to the AC power line system 1.

Figure 3:
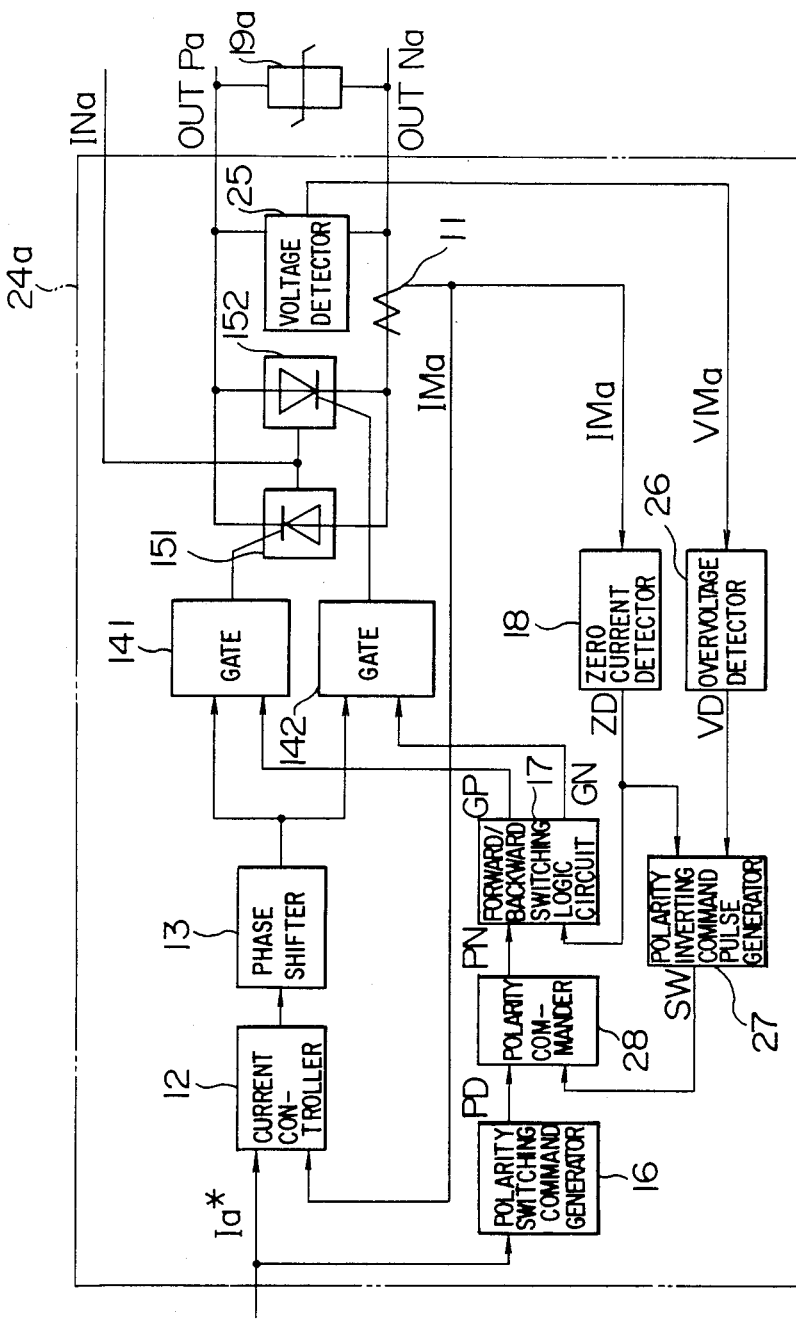
FIG. 3 is a block diagram showing details of one-phase channel of a power converter in FIG. 1.

Each of the power converters 24a, 24b and 24c has the same construction and FIG. 3 illustrates a detailed circuit of one-phase channel of the power converter by way of example of power converter 24a.

Referring to FIG. 3, a current detector 11 detects one phase of the secondary current of the induction machine 2, a current controller 12 compares the current command Ia* with a detected value $I_{Ma}$ and instructs a phase shifter 13 to generate a thyristor igniting pulse at a predetermined phase on one of the three phases, a gate 141 is operative to pass a gate pulse which drives a thyristor gate of a forward thyristor converter 151, a gate 142 is operative to pass a gate pulse which drives a thyristor gate of a backward thyristor converter 152, and a polarity switching command generator 16 is responsive to positive or negative polarity of the current command Ia* to generate a polarity switching command signal Pd which takes "1" level for conducting the secondary current through the forward converter 151 and takes "0" level for conducting the secondary current through the backward converter 152. A zero current detector 18 recognizes the detected current $I_{Ma}$ to be zero by producing "0" level of an output signal ZD and recognizes the detected current $I_{Ma}$ to be flowing by producing "1" level of the output signal ZD. An overvoltage detector 26 responds to an output signal $V_{Ma}$ of a voltage detector 25 adapted to detect the output voltage of the power converter and produces "1" level of an output signal VD when the output signal $V_{Ma}$ is greater than a positive set value Vp, "−1" level of the output signal VD when the output signal $V_{Ma}$ is smaller than a negative set value $V_N$, and "0" level of the output signal VD when the other situation occurs, indicating $V_N \leq V_{Ma} \leq Vp$. It is herein prescribed that the direction of the voltage signal $V_{Ma}$ is positive on condition that the thyristor of the forward thyristor converter 151 is applied with a forward voltage when a voltage of $V_{Ma}$ is applied across output terminals of the power converter 24a while short-circuiting terminals of the receiving transformer 8. A polarity inverting command pulse generator 27 normally produces a "0" level signal but under the application of "0" level of the zero current signal ZD, it produces an inverting command pulse SW of positive "1" level when the overvoltage signal VD changes from "0" to "1" and produces negative "−1" level of the pulse SW when the overvoltage signal VD changes from "0" to "−1". A special circuit arrangement is provided so that once a single pulse SW is produced, further production of pulse SW is inhibited for a preset period of time following the production of the single pulse SW even if the conditions for production of pulse SW are satisfied. The circuit arrangement to this end may be realized readily using a monostable multivibrator for generating a pulse width equal to the preset period of time and a gate for pulse passage in combination. The preset period of time corresponds to an interval of time during which backward polarity current is initiated to conduct in response to generation of the inverting command pulse SW and thereafter the zero current signal ZD changes from "0" to "1". A polarity commander 28 is connected to receive the output signal PD of the polarity switching command generator 16 for the secondary current and the inverting command pulse SW and it produces a forward-/backward switching command signal PN. When the command pulse SW is "0", the signal level of the switching command signal PN equals that of the signal PD. With a positive inverting command pulse SW applied, the switching command signal PN momently assumes "1" level irrespective of the signal level of the signal PD and with a negative inverting command pulse SW applied, the switching command signal PN momently assumes "0" level irrespective of the level of the signal PD. A forward/backward switching logic circuit 17 is connected to receive the signal PN from the polarity commander 28 and the signal ZD from the zero current detector 18 and it produces drive/stop signals GP and GN for the forward gate 141 and backward gate 142, respectively. These drive/stop signals take "1" level for driving and "0" level for stopping.

Figure 4:
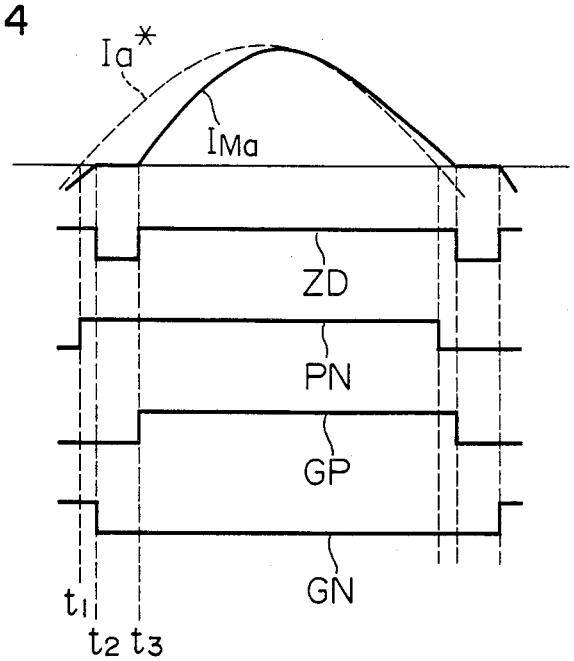
FIGS. 4 to 6 are waveform diagrams for explaining the operation of the invention.
Figure 5:
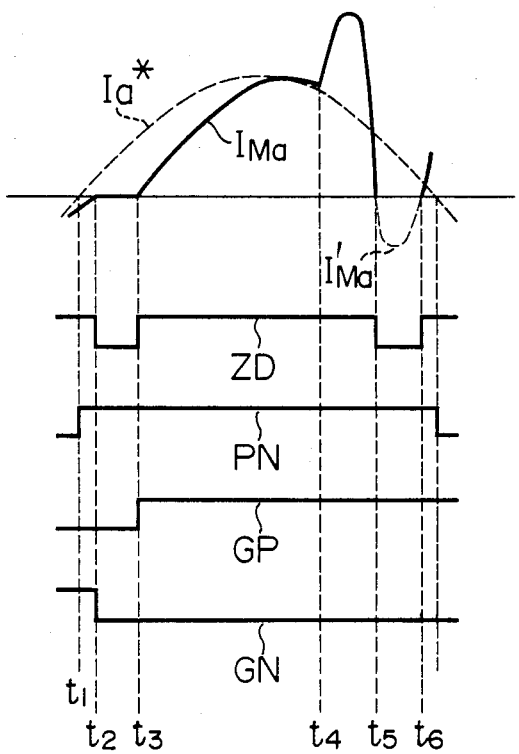
Figure 6:
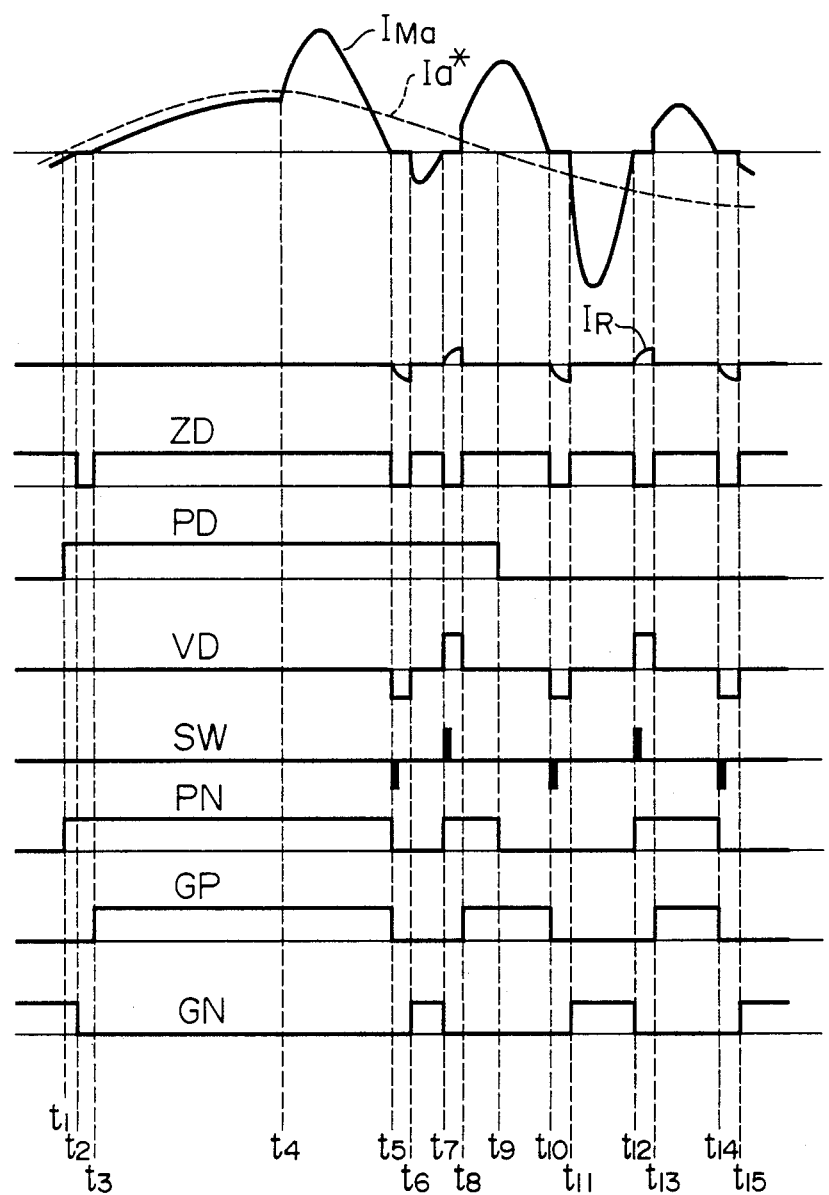

With the construction described so far, various waveforms develop as shown in FIGS. 4 to 6. Particularly, FIG. 4 illustrates waveforms developing when voltage on the AC power line system 1 is normal and the system is in the stationary state, and FIG. 6 illustrates waveforms developing when the induction machine 2 is in operation. Referring to FIGS. 4 and 6, as the polarity of the current command Ia* changes from negative to positive at time $t_1$, the output signal PD of the polarity switching command generator 16 changes from "0" level to "1" level. Since the signal SW is at "0" level under the normal operation, the output signal PN of the polarity commander 28 also changes from "0" level to "1" level. The power converter of this invention is a non-circulating current type cyclo-converter and therefore, at time $t_2$ that the secondary current $I_{Ma}$ becomes "0", the level of the signal GN which has provided a drive command to the backward gate 142 first changes from "1" to "0" and the supply of the thyristor igniting pulse from the phase shifter 13 to the backward thyristor converter 152 is inhibited. Concurrently, the power converter 24a comes into a pause period and a voltage due to mutual induction will be induced. But, magnetic unbalance in the induction machine 2 is small and hence the output signal VD of the overvoltage detector 26 remains at "0" level. Consequently, the polarity inverting command pulse generator 27 will not produce a pulse and as a result, the signal PN is maintained at "1" level. At time $t_3$ that the time corresponding to a thyristor turn-off time has expired, the drive command GP to the forward gate 141 changes from "0" level to "1" level, so that the gate of the forward thyristor converter 151 is energized to cause the secondary current to start flowing in the forward direction.

FIG. 5 illustrates operational waveforms developing when voltage on the AC power line system varies in an instant. The operation until time $t_4$ is the same as that of FIG. 4 and will not be described. When the voltage on the AC power line system 1 changes abruptly at time $t_4$, a transient current of rotating frequency component is generated in the secondary side. A secondary current $I_{Ma}$ superimposed with the rotating frequency component becomes zero at time $t_5$, but because the polarity of the command Ia* remains unchanged, the forward-/backward switching command generator 16 does not operate and the signal PN is maintained at "1" level. At time $t_5$, the signal GN remains at "0" level and the power converter comes into pause.

If, as in the prior art, the overvoltage detector 26, polarity inverting command pulse generator 27 and polarity commander 28 are not provided and hence the output signal of the polarity switching command generator 16 is directly applied to the forward/backward switching logic circuit 17, then the forward thyristor converter 151 restarts to conduct at time $t_6$ following the pause of the power converter initiated at time $t_5$. Consequently, during an interval of time from time $t_5$ to time $t_6$, the secondary current of the induction machine 2 in the corresponding phase is opened and magnetic unbalance due to the varying difference from a current waveform $I_{Ma}'$ necessary for maintaining magnetic balance causes a large induced voltage to develop in the opened secondary winding. Disadvantageously, this induced voltage will damage the thyristor coverters 151 and 152 of power converter 24a and the secondary winding of induction machine 2.

When the voltage on the AC power line system changes abruptly, the system of the present invention operates as will be described below with reference to FIGS. 3 and 6. At time $t_4$, the voltage on the AC power line system 1 changes abruptly and then a transient current of rotating frequency component is generated. Owing to the rotating frequency component superimposed on the secondary current $I_{Ma}$, this secondary current $I_{Ma}$ becomes zero at time $t_5$ and the zero current detection signal ZD changes from "1" level to "0" level. Concurrently, the power converter is opened to generate an overvoltage. The polarity of the overvoltage is always forward with respect to a thyristor converter to be operated next. Therefore, at time $t_5$, the overvoltage new generated is backward and the overvoltage detection signal VD changes from "0" to "−1". As a result, the polarity inverting command pulse generator 27 produces a negative pulse SW, causing the signal PN to be inverted from "1" level to "0" level. Because the zero current detection signal ZD has already been changed to "0", the level of the drive command GP for the forward gate 141 changes from "1" to "0". At time $t_6$ that a pause period has expired, the drive command signal GN for the backward gate 142 changes from "0" level to "1" level and a current $I_R$ conducts through a non-linear resistor element 19a during an interval of time which ends with initiation of a backward current conduction. In contrast to the negative pulse SW generated at time $t_5$, a positive pulse SW is generated at time $t_7$, inverting the polarity commander 28. At time $t_8$, the forward thyristor converter 151 begins to conduct. At time $t_9$, the polarity of the current commands Ia* changes from positive to negative, changing the level of the output signal PD from "1" to "0". Concurrently with the changing of the output signal PD of polarity switching command generator 16 from "1" level to "0" level, the polarity command signal PN changes from "1" to "0". However, since the zero current signal ZD remains at "1" level, both the drive command signals GP and GN for the gates 141 and 142 are maintained at "1" level. When the current $I_{Ma}$ becomes zero at time $t_{10}$, as at time $t_5$, a negative inverting command pulse SW of "−1" is produced. But the polarity command signal PN has already been at "0" level and it will not any more be inverted. On the other hand, the zero current signal ZD changes from "1" level to "0" level and therefore the drive command GP for the forward gate 141 changes from "1" level to "0" level. At time $t_{11}$ that a pause period has elapsed from time $t_{10}$, the drive command signal GN for the backward gate 142 changes from "0" level to "1" level, causing a backward current to initiate conduction.

As described above, according to this embodiment, the non-linear resistor element 19a is loaded with current conduction only during the pause period of the power converter 24a, in order to realize protection against induced overvoltage while reducing current capacity of the resistor element to a great extent. In addition, the power converter 24a (24b, 24c), even in the form of the non-circulating type cyclo-converter, is permitted to conduct the current of rotating frequency component during the transition so as to prevent the generation of overvoltage and besides, it is permitted to continue thyristor phase control. This ensures that the generator/motor operation can continue even when a transient phenomenon takes place on the AC power line system 1 and a highly reliable generator/motor system can be realized.

Figure 7:
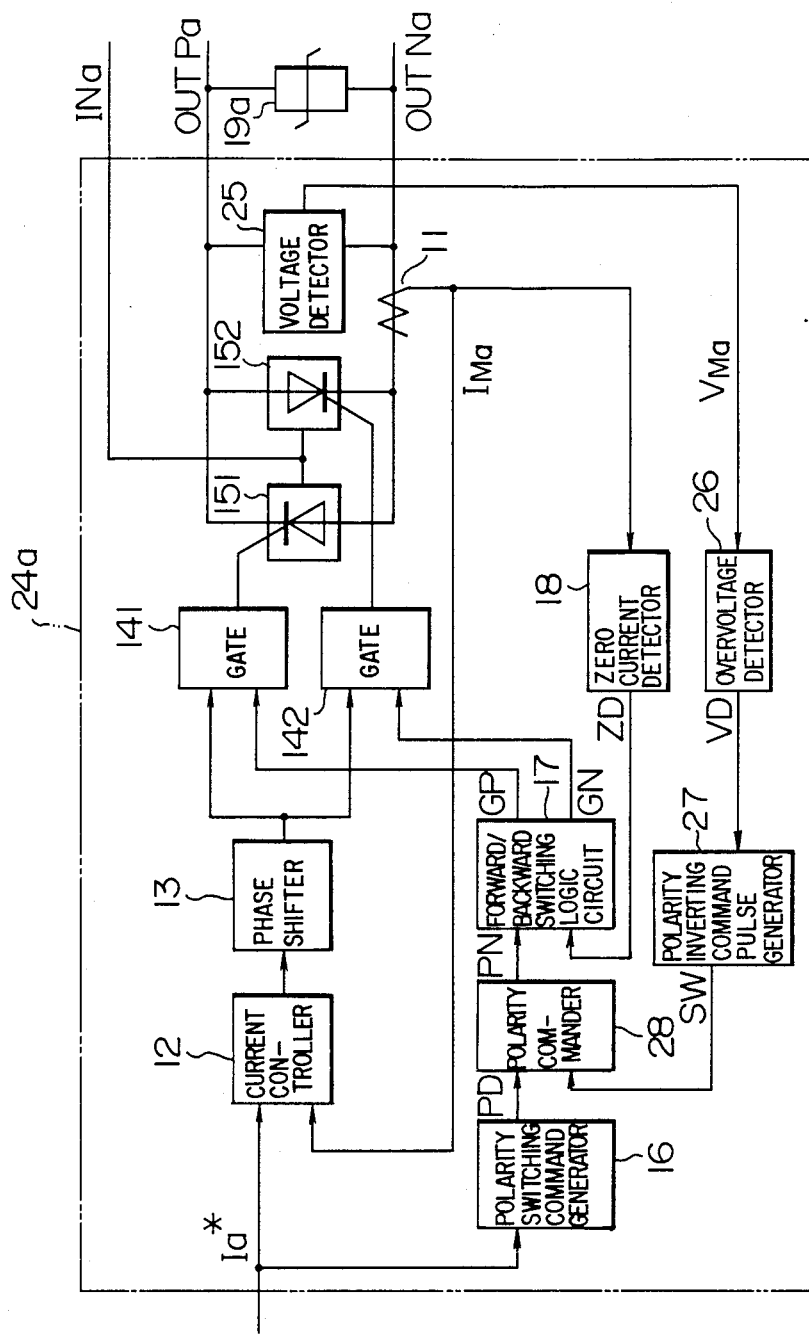
FIGS. 7 and 8 are block diagrams showing further embodiments of the invention.

FIG. 7 shows another embodiment of the invention. In contrast to the fact that the polarity inverting command pulse generator 27 of FIG. 3 receives the zero current signal ZD to generate the polarity inverting command pulse SW, a polarity inverting command pulse generator 29 is connected to receive only the overvoltage signal VD. It is not until the open-circuiting of the power converter 24 that the induced voltage becomes excessively large and therefore, confirmation of the zero current by the zero current signal ZD is rather superflows. The FIG. 7 embodiment is based on this thinking.

Figure 8:
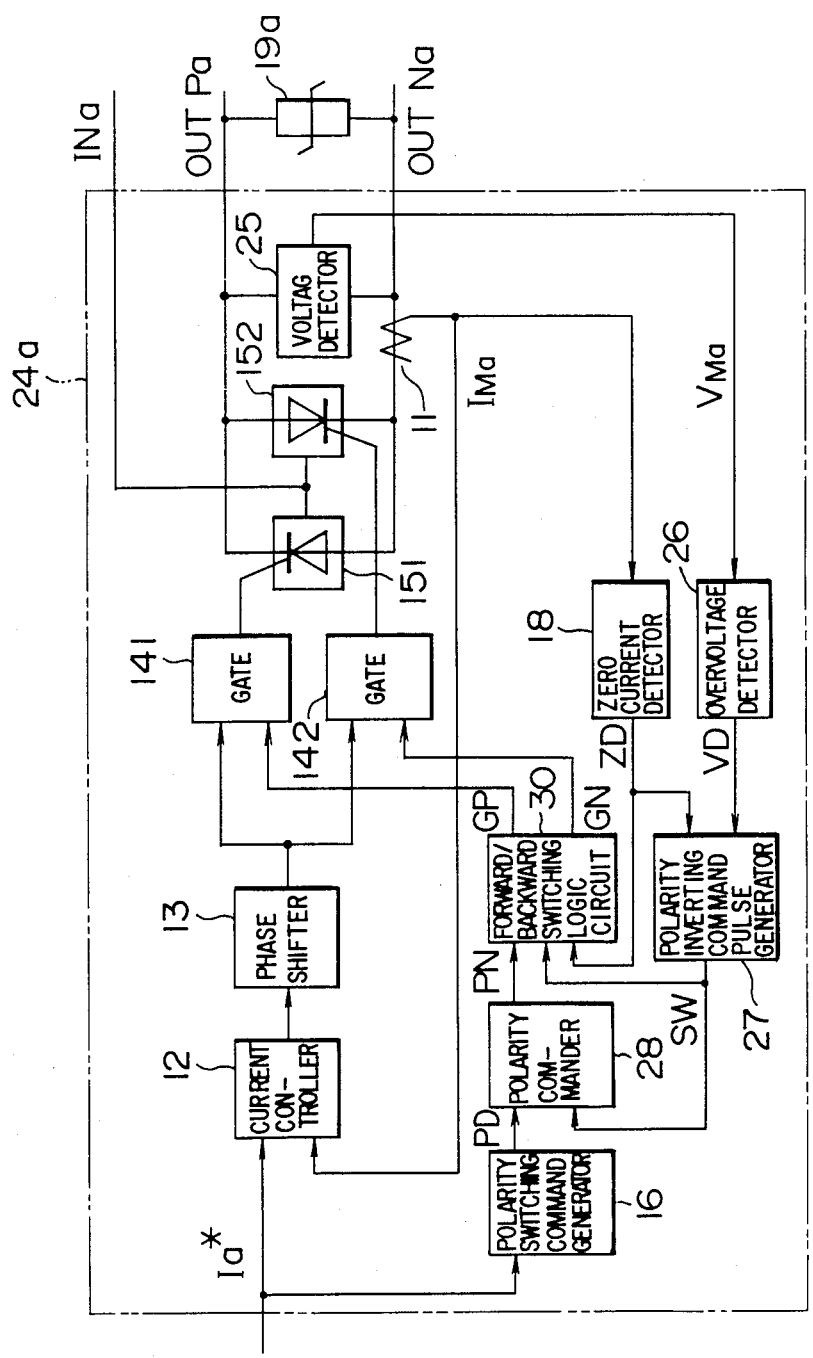

FIG. 8 shows still another embodiment of the invention wherein a forward/backward switching logic circuit 30 corresponding to the forward/backward switching logic circuit 17 of the FIG. 3 embodiment is connected to receive the inverting command pulse SW. In the FIG. 3 embodiment, when the zero current signal ZD changes from "1" to "0" following the inversion of the polarity command signal PN, the drive command signal GP for a thyristor converter which has been in conduction polarity till then is changed from "1" to "0" and after the pause period therefrom expires, the drive command signal GN for the opposite polarity is changed from "0" to "1". Further, upon the polarity switching by the overvoltage signal VD, the pause period occurs as in the ordinary polarity switching. However, as is clarified in connection with the FIG. 7 embodiment, the change of overvoltage VD from "0" to "±1" duly presupposes that the current $I_{Ma}'$ has already become zero. In performing the ordinary polarity switching during, for example, a period ranging from time $t_2$ to time $t_3$ in FIG. 6 an interval of time in compliance with the accuracy of the current detector 11 must be added to the thyristor turn-off time. In view of the above, the FIG. 8 embodiment additionally comprises an arrangement which shortens the pause period in the event that the polarity switching pulse SW assumes "±1" and at the same time the signal ZD assumes "0" level. Of course, the polarity switching pulse generator 27 in FIG. 8 may be replaced with the pulse generator 29 in FIG. 7.

Figure 9:
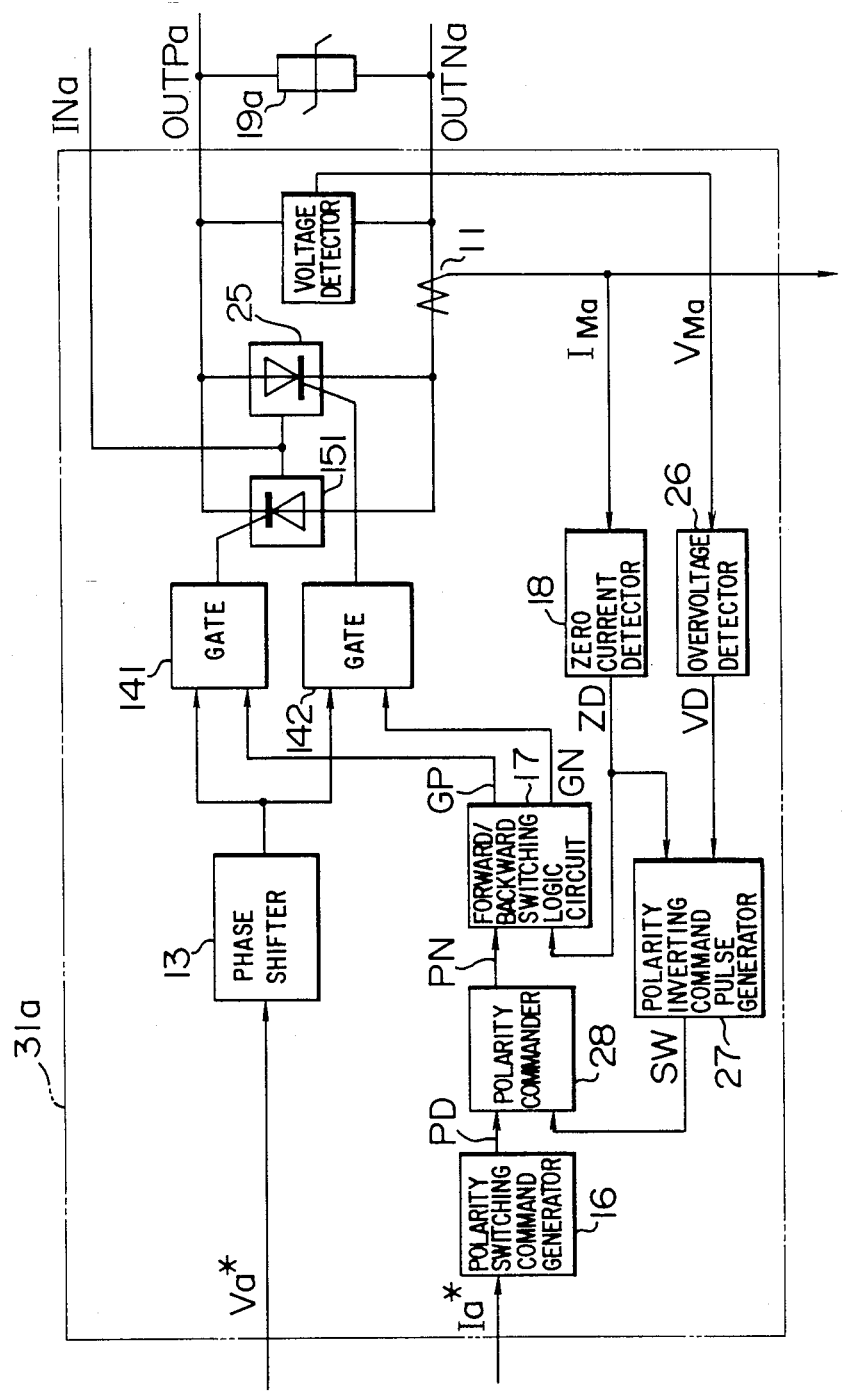
FIGS. 9 to 11 show a still further embodiment of the invention.
Figure 10:
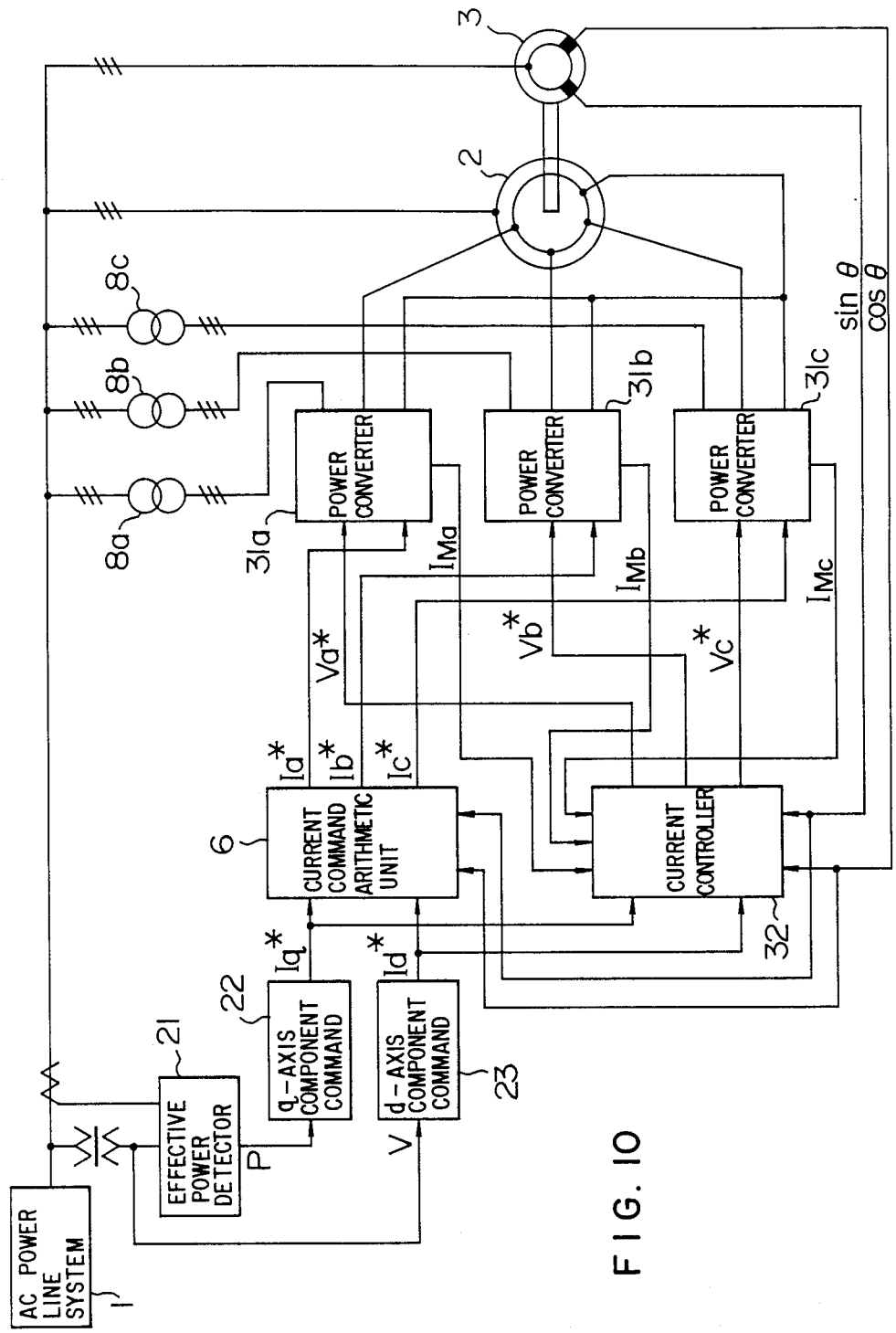
Figure 11:
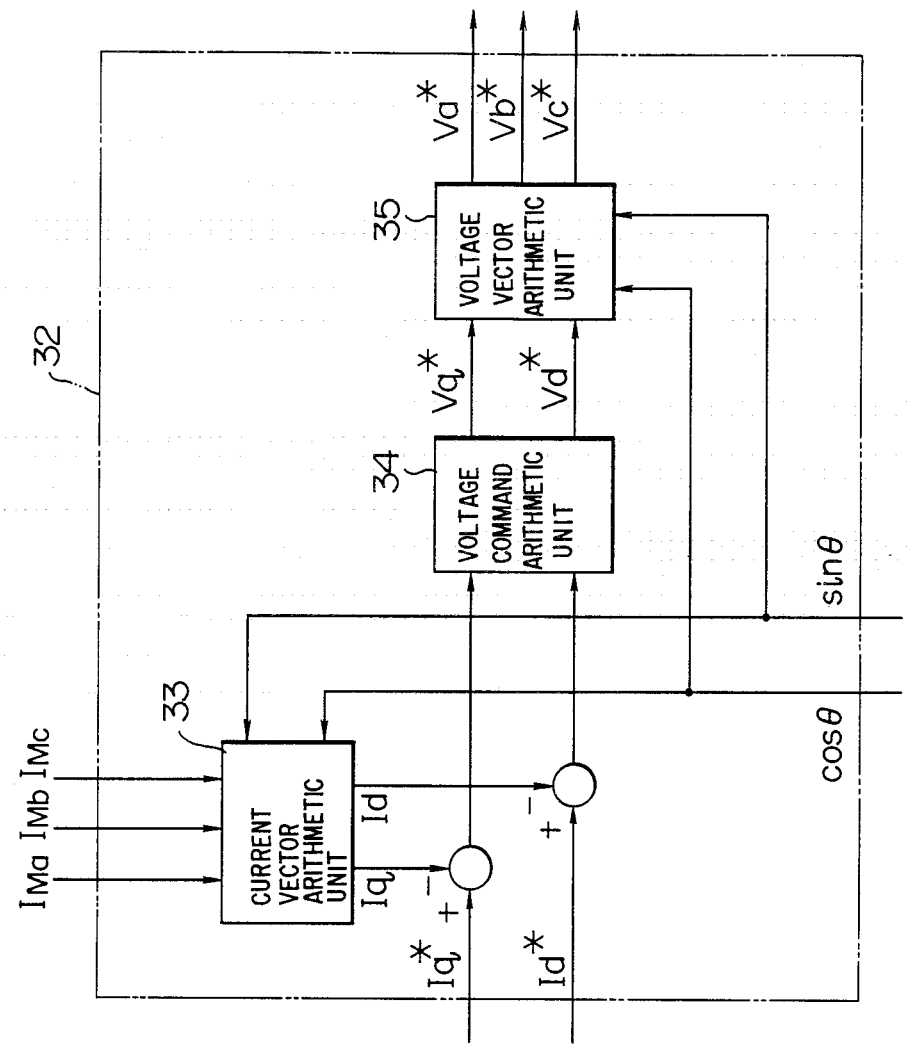

FIGS. 9 to 11 illustrate a further embodiment of the invention. In the previous embodiments of FIGS. 3, 7 and 8, the current controllers 12 are provided for the respective secondary phase channels and connected to separately receive the difference between each of the current commands Ia* to Ic* and each of the detected values $I_{Ma}$ to $I_{Mc}$ so as to generate the command signal to the phase shifter 13 of each phase channel. A power converter of each phase channel, for example, converter 31a of the FIG. 9 embodiment is so configured as to cooperate with a current controller 32 which, as illustrated in a system arrangement of FIG. 10, responds to the current detection values $I_{Ma}$, $I_{Mb}$ and $I_{Mc}$ to collectively produce commands to the phase shifters of the respective phase channels. In this embodiment, a phase shifter 13 is connected to receive a command Va* from the current controller 32, a polarity switching command generator 16 is connected to receive the command Ia* from the current command arithmetic unit 6, and the detection signal $I_{Ma}$ from the current detector 11 is fed back to the current controller 32. FIG. 11 details the construction of the current controller 32. A current vector arithmetic unit 33 receives the current detection values $I_{Ma}$, $I_{Mb}$ and $I_{Mc}$ of the respective phases of secondary current and the output signals cos $\theta$ and sin $\theta$, generating q-axis and d-axis component current signals Iq and Id pursuant to equation (2) as below:

$$\begin{bmatrix} I_q \\ I_d \end{bmatrix} = K_1 \begin{bmatrix} \cos\theta, & \left(\frac{-1}{2}\right)\cos\theta + \left(\frac{\sqrt{3}}{2}\right)\sin\theta, & \left(\frac{-1}{2}\right)\cos\theta + \left(\frac{-\sqrt{3}}{2}\right)\sin\theta \\ \sin\theta, & \left(\frac{-1}{2}\right)\sin\theta + \left(\frac{-\sqrt{3}}{2}\right)\cos\theta, & \left(\frac{-1}{2}\right)\sin\theta + \left(\frac{\sqrt{3}}{2}\right)\cos\theta \end{bmatrix} \begin{bmatrix} I_{Ma} \\ I_{Mb} \\ I_{Mc} \end{bmatrix} \quad (2)$$

where $K_1$ is a constant.

A voltage command arithmetic unit 34 calculates a voltage command Vq* from the difference between q-axis component current command Iq* and detection value Iq and a voltage command Vd* from the difference between d-axis component current command Id* and detection value Id. A voltage vector arithmetic unit 35 having a similar construction to that of the current vector arithmetic unit is connected to receive the q-axis and d-axis component voltage commands Vq* and Vd* so as to calculate the commands Va*, Vd* and Vc* for the phase shifters of the respective secondary phase channels pursuant to equation (3) as below:

$$\begin{bmatrix} V_a^* \\ V_b^* \\ V_c^* \end{bmatrix} = K_2 \begin{bmatrix} \cos\theta, & \sin\theta \\ \left(\frac{-1}{2}\right)\cos\theta + \left(\frac{\sqrt{3}}{2}\right)\sin\theta, & \left(\frac{-1}{2}\right)\sin\theta + \left(\frac{-\sqrt{3}}{2}\right)\cos\theta \\ \left(\frac{-1}{2}\right)\cos\theta + \left(\frac{-\sqrt{3}}{2}\right)\sin\theta, & \left(\frac{-1}{2}\right)\sin\theta + \left(\frac{\sqrt{3}}{2}\right)\cos\theta \end{bmatrix} \begin{bmatrix} V_q^* \\ V_d^* \end{bmatrix} \quad (3)$$

where $K_2$ is a constant.

Figure 12:
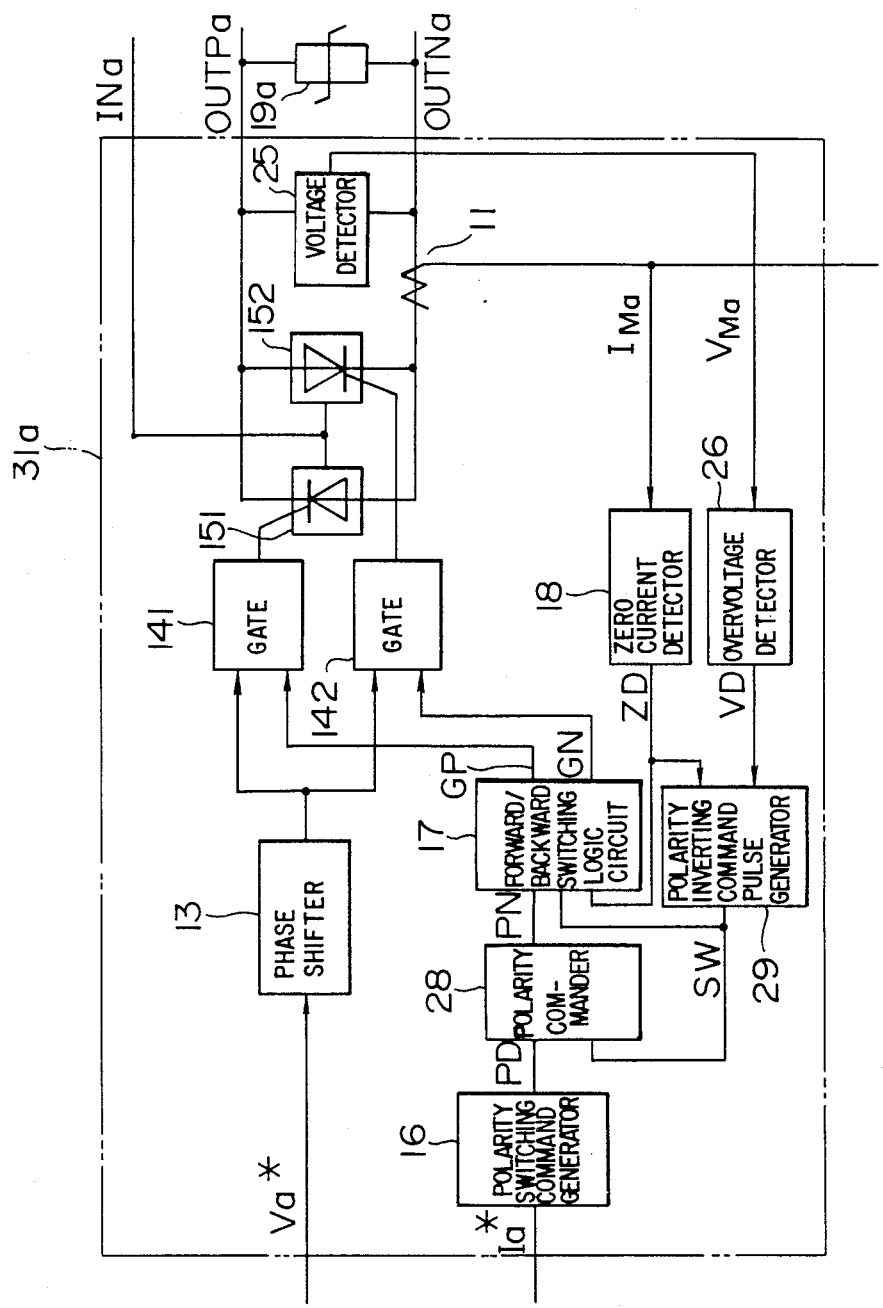
FIGS. 12 and 13 show yet still further embodiments of the invention.

FIG. 12 shows a modified embodiment of the FIG. 9 power converter wherein the pulse generator 29 shown in FIG. 7 is used.

Figure 13:
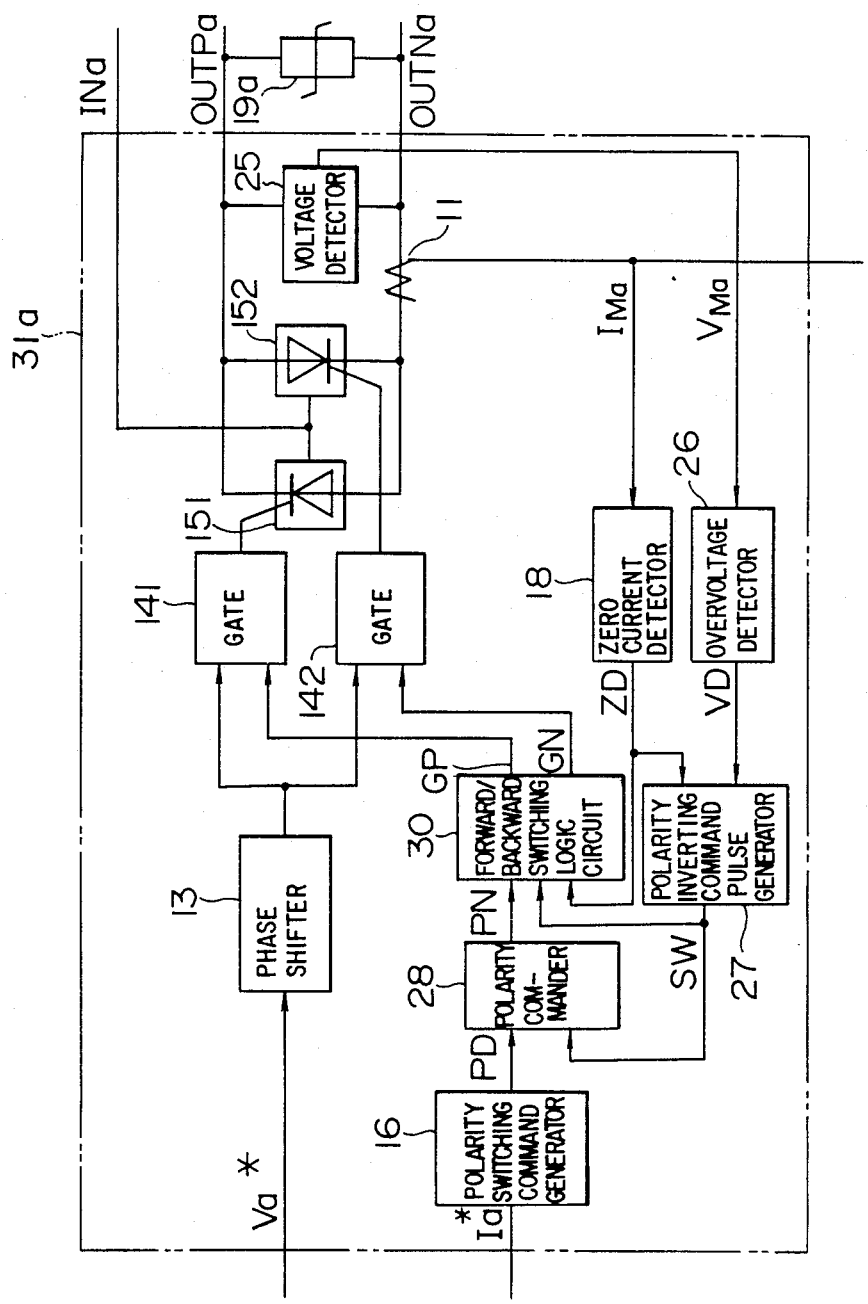

FIG. 13 shows another modified embodiment of the FIG. 9 power converter wherein the forward/backward switching logic circuit 30 shown in FIG. 8 is used.

By collectively issuing the commands to the phase shifters of the respective phase channels in accordance with the arrangement of FIG. 10, interference between the q-axis and d-axis components can be weakened to ensure simultaneous speed-up of both the voltage controlling and effective power controlling and besides, the transient phenomenon due to rapid changes in voltage on the AC power line system can also be suppressed.

According to the invention, in the induction generator/motor system wherein the non-circulating type cyclo-converter is connected to the secondary side of the induction machine, apparatus of the generator/motor system can be protected from an induced voltage due to a transient phenomenon occurring in the AC power line system to enhance reliability of the generator/motor system and at the same time the cyclo-converter controlling can continue to perform even during the transient phenomenon to thereby improve stability and operational reliability during the transition. Further, the above advantages can be attained without altering capacity of the induction machine and cyclo-converter, thereby making it possible to maintain econ- omization of the generator/motor system.

We claim:

1. An induction generator/motor system comprising:
    a wound-rotor induction machine having secondary phases and connected at its primary side to an AC power line system;
    thyristor power converter means connected to each of the secondary phases of said induction machine, for supplying secondary current to said induction machine, said thyristor power converter means including a thyristor converter comprised of a forward thyristor converter and a backward thyristor converter connected in anti-parallel relationship with the forward thyristor converter;
    a phase detector for detecting a slip phase equal to a difference between a phase of voltage on said AC power line system and a rotating phase on the secondary side of said induction machine in terms of electrical angle;
    current command generating means for generating a secondary current command for said induction machine, said secondary current command containing two components having phases relative to the slip phase which are $\pi/2$ out of phase mutually;
    a current command arithmetic unit for generating a current pattern in each phase on the secondary side on the basis of the current command from said current command generating means and the slip phase detected by said phase detector;
    a current detector for detecting an output current of said thyristor power converter means;
    phase controlling means for controlling a thyristor igniting phase of said thyristor power converter means on the basis of the current command from said current command generating means, the slip phase detected by said phase detector and a current detection value from said current detector;
    polarity switching means for generating a forward-/backward command signal for said thyristor power converter means on the basis of the current detection value of said current detector and the current pattern generated from said current command arithmetic unit;
    a voltage detector for detecting a voltage across output terminals of said thyristor power converter means; and
    polarity inverting means for causing, when the detection voltage from said voltage detector exceeds a predetermined set range which covers the output voltage derivable from said thyristor power converter means, said polarity switching means to generate said forward/backward command signal whereby the polarity direction of said detection voltage in excess of said set range is rendered forward.

2. An induction generator/motor system according to claim 1 wherein said polarity inverting means comprises polarity inverting command means for producing a polarity inverting command signal in accordance with a polarity of said detection voltage when said detection voltage exceeds said predetermined set range, and a polarity commander responsive to the polarity inverting command signal from said polarity inverting command means to cause said polarity switching means to generate said forward/backward command signal.

3. An induction generator/motor system according to claim 2 wherein said polarity inverting command means comprises an overvoltage detector for detecting the polarity of said detection voltage when said detection voltage exceeds said predetermined set range, and a polarity inverting pulse generator responsive to the polarity of said detection voltage from said overvoltage detector to generate the polarity inverting command signal whereby the polarity direction of said detection voltage is rendered forward.

4. An induction generator/motor system according to claim 2 wherein said polarity inverting command means further comprises a zero current detector for detecting that the detection current of said current detector becomes substantially zero, and means for generating said polarity inverting command signal only when said zero current detector detects zero current.

5. An induction generator/motor system according to claim 2 wherein said polarity switching means further comprises means for shortening a pause period for polarity switching by said thyristor power converter when said polarity inverting command means generates the polarity inverting command signal at the time that the detection current of said current detector becomes substantially zero.

6. An induction generator/motor system comprising:

an induction machine having secondary phases and connected at its primary side to an AC power line system;

thyristor power converter means connected to each of the secondary phases of said induction machine, for supplying secondary current to said induction machine, said thyristor power converter means including a thyristor converter comprised of a forward thyristor converter and a backward thyristor converter connected in anti-parallel relationship with the forward thyristor converter;

a phase detector for detecting a slip phase equal to a difference between a phase of voltage on said AC power line system and a rotating phase on the secondary side of said induction machine in terms of electrical angle;

current command generating means for generating a secondary current command for said induction machine, said secondary current command containing two components having phases relative to the slip phase which are $\pi/2$ out of phase mutually;

a current command arithmetic unit for generating a current pattern of each secondary phase of said induction machine from the current command and the slip phase of said phase detector;

a current detector for detecting an output current of said thyristor power converter means;

phase controlling means for controlling a thyristor igniting phase of said thyristor power converter means such that the difference between a current detection value from said current detector and the current pattern generated from said current command arithmetic unit becomes zero;

polarity switching means for generating a forward/backward command signal for said thyristor power converter means on the basis of the current detection value of said current detector and the current pattern generated from said current command arithmetic unit;

a voltage detector for detecting a voltage across output terminals of said thyristor power converter means; and polarity inverting means for causing, when the detection voltage from said voltage detector exceeds a predetermined set range which covers the output voltage derivable from said thyristor power converter means, said polarity switching means to generate said forward/backward command signal whereby the polarity direction of said detection voltage in excess of said set range is rendered forward.

* * * * *